United States Patent [19]

Oberle et al.

[11] Patent Number: 4,537,915

[45] Date of Patent: Aug. 27, 1985

[54] CHAR RESISTANT FOAMS

[75] Inventors: Patrick Oberle, Reichstett; Michel Longuet, Haguenau, both of France; David Walker, Onnens, Switzerland

[73] Assignee: Polysar International S.A., Canton of Fribourg, Switzerland

[21] Appl. No.: 492,712

[22] Filed: May 9, 1983

[30] Foreign Application Priority Data

May 7, 1982 [FR] France .................. 82 07948

[51] Int. Cl.³ .............................. C08J 9/30; C08J 9/00
[52] U.S. Cl. ..................... 521/84.1; 521/70; 521/71; 521/907
[58] Field of Search ............... 260/739, 722, 723, 724, 260/725; 521/70, 71, 907, 84.1; 524/141, 296

[56] References Cited

U.S. PATENT DOCUMENTS 3,699,041 10/1972 Sanderford et al. ............... 521/71
4,228,245 10/1980 Morgan et al. ................... 521/907

FOREIGN PATENT DOCUMENTS 2750467 6/1978 Fed. Rep. of Germany .
2075023 11/1981 United Kingdom .
2076404 12/1981 United Kingdom .
2096615 10/1982 United Kingdom .

OTHER PUBLICATIONS

Condensed Chemical Dictionary, 5th Ed., Reinhold, N.Y., (1956), p. 48.

Primary Examiner—Herbert S. Cockeram
Attorney, Agent, or Firm—Stevens, Davis, Miller & Mosher

[57] ABSTRACT

The resistance to internal charring of molded styrene-butadiene latex foam rubber when exposed to a lit cigarette is improved by incorporating from about 10 to 30 parts by dry weight, per hundred parts by dry weight of latex of a compound selected from the group consisting of an organic phosphate of the formula

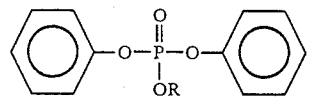

wherein R is a $C_{6-12}$ alkyl radical or a phenyl radical, which is unsubstituted or substituted by a $C_{1-4}$ alkyl radical, butyl benzyl phthalate, and a mixture thereof.

16 Claims, No Drawings

CHAR RESISTANT FOAMS

British test procedure BS 5852: Part 1: 1979 sets forth a test procedure for the ignitability by smokers' materials of upholstered composites for seating. Seating products sold in the United Kingdom subsequent to the fall of 1982 must be capable of passing this test. The test involves placing a lit cigarette in a position to simulate the juncture of the seat and back of an upholstered composite for seating. The cigarette is permitted to burn out and notice is taken of any sign of flaming or progressive smoldering that occurs within a period of one hour after the extinction of the cigarette. Slow progressive smoldering of the foam results in carbonization or charring of the interior of the foam.

Upholstered composites for seating manufactured from polyurethane foam or natural latex foam rubber can pass the test without significant surface charring. Upholstered composites for seating manufactured from styrene-butadiene latex foam rubber or from latex foam rubber made from a blend of natural and styrene-butadiene latices containing less than about 70 percent by weight of natural rubber latex do not pass the test as these foams char at the surface and subsequent to the burning out of the cigarette may continue to smolder internally. This tends to result in the internal core of the foam becoming a hard black charred mass. In some instances such foams may smolder internally until ignition temperature is reached and the foam then bursts into flame.

Unfortunately, natural rubber latex is not uniform and this may cause difficulties in foam manufacture. Furthermore, natural rubber latex is not as readily available in large quantities as is styrene-butadiene latex and is usually relatively more expensive. While polyurethane foams are readily available, they lack some of the resilient properties of foams manufactured from natural rubber latex, styrene-butadiene latex or blends of these latices.

There is a need to develop a styrene-butadiene latex which may optionally contain a minor amount of natural rubber latex which can be used to manufacture a molded foam for use in upholstered seating and mattresses, which is capable of withstanding exposure to a lit cigarette without flaming or progressive smoldering.

BACKGROUND OF THE INVENTION

U.K. Patent Application No. 2,075,023 teaches the use of 5-30 phr of castor oil in SBR or polybutadiene latex foam rubber to impart resistance to charring. U.K. Patent Application No. 2,076,404 teaches the use of thiols, disulphides, aliphatic primary amines, guanidines or guanidine derivatives in a polybutadine or SBR latex foam rubber containing up to 40 percent by weight of natural rubber latex in order to produce a non-smoldering foam.

There are several well known additives for imparting flame retardance to a foam material. Inorganic flame retardants such as antimony oxide may be added to the foam composition. Halogen generating compounds such as chlorinated paraffin wax may be added to the foam composition. The foam composition may be modified by the addition of a phosphate flame retardant. It is also known that the above additives may be used in combination.

While a flame retardant will supress the propagation of open flame, it may not be useful to prevent internal charring and applicant has found that most of the conventional flame retardant additives do not prevent internal charring of styrene-butadiene latex foam rubber. Applicant has found that certain organic phosphates, butyl benzyl phthalate or mixtures of these do give substantially improved resistance to internal charring.

SUMMARY OF THE INVENTION

Accordingly, the present invention provides a latex composition comprising from about 0 to about 15 parts by dry weight of natural rubber latex and correspondingly from about 100 to about 85 parts by dry weight of styrene-butadiene polymer latex having a styrene:butadiene ratio of from about 20:80 to about 40:60, and per 100 parts by dry weight of total latex from about 10 to about 30 parts by weight of a compound selected from the group consisting of an organic phosphate of the formula

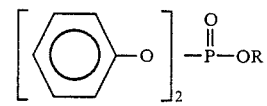

wherein R is a $C_{6-12}$ alkyl radical or a phenyl radical which is unsubstituted or substituted by a $C_{1-4}$ alkyl radical, butyl benzyl phthalate, and mixtures thereof.

The present invention also provides an improved method of imparting resistance to charring to a molded foam manufactured from a latex comprising from about 0 to about 15 parts by dry weight of natural rubber latex and correspondingly from about 100 to about 85 parts by dry weight of styrene-butadiene polymer latex having a styrene:butadiene ratio of from about 20:80 to about 40:60 which method comprises adding to the total latex from about 10 to about 30 parts by weight per 100 parts by dry weight of said total latex of a compound selected from the group consisting of an organic phosphate of the formula

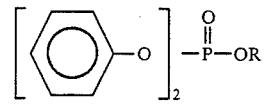

wherein R is a $C_{6-12}$ alkyl radical or a phenyl radical which is unsubstituted or substituted by a $C_{1-14}$ alkyl radical, butyl benzyl phthalate, and mixtures thereof.

DESCRIPTION OF THE PREFERRED EMBODIMENTS

In order to improve the processability of the latex during manufacture of the foam, it is preferable to blend a minor amount of natural rubber latex with a major amount of styrene-butadiene polymer latex. This blending has no significant effect on the resistance to charring of the foam, i.e. addition of the hereinabove defined compound is required. The preferred latex is a blend of from about 5 to 15 parts by dry weight of natural rubber latex and correspondingly from about 95 to about 85 parts by dry weight of styrene-butadiene polymer latex. Best results are obtained with a dry weight ratio of natural rubber latex:styrene-butadiene polymer latex of about 10:90.

The styrene-butadiene polymer latex is one which ought to be suitable for the manufacture of molded foam products. The ratio of styrene to butadiene in the latex may range from about 20:80 to about 40:60. The prefered ratio of styrene to butadiene is about 30:70.

When the compound added to the latex is an organic phosphate as defined hereinabove R may be a $C_{6-12}$ alkyl radical. Preferably R is a $C_{8-10}$ alkyl radical and most preferably is a $C_8$ or a $C_{10}$ alkyl radical. R may also be a phenyl radical which is unsubstituted or substituted by a $C_{1-4}$ alkyl radical. Preferably R is a phenyl or a tertiary butyl phenyl radical.

The compound added to the latex is added in an amount from about 10 to about 30 parts by weight per 100 parts by dry weight of total latex. Preferably the amount of compound is from about 15 to about 20 parts by weight of compound per 100 parts by dry weight of total latex.

The latex composition containing the additive may be compounded in a conventional manner for the manufacture of molded foam. Thus, the latex composition may be mixed with conventional fillers. In the manufacture of molded foams for composites for seating, fillers may be used in amounts up to 80 parts by weight of filler per 100 parts by dry weight of latex. The quality of the molded foam usually improves with lower amounts of filler. Thus, the filler level may be reduced to less than about 60 parts by weight of filler per 100 parts by dry weight of latex. The preferred level of filler is about 40 parts by weight of filler per 100 parts by dry weight of latex. The filler may be any conventional filler such as clay or finely divided silica or mica. However, a flame retardant filler may also be used alone or as a co-filler. Thus the filler may be a flame retardant metal hydrate such as alumina trihydrate which releases water at relatively low temperatures.

The latex of the present invention may be molded in any conventional manner. Two useful gelling agents are sodium silicofluoride and ammonium acetate. The conditions for manufacturing molded gelled foam are well known to those skilled in the art.

The following is intended to illustrate the invention without limiting its scope.

A series of foams, 20 cm in diameter and 6 cm thick, were prepared using conventional molded foam techniques. The latex was compounded with 40 parts of filler per 100 parts by dry weight of latex. The filler was alumina trihydrate. A piece of cloth was then pinned to the top of the foam so that the cloth and foam were in close contact.

The foam was then placed in a draught-free enclosure and a lighted cigarette was placed on the central part of the surface of the covered foam and the cigarette was permitted to burn out. In order to pass the test the foam should not burn after extinction of the cigarette nor show signs of internal charring. The foam was cut open to observe any internal charring. The results are set forth in Table I. In Table I, the term phr refers to the amount of additive by weight per 100 parts by dry weight of latex. Where a blend of latices is used, the number preceeding the latex refers to the proportion by dry weight of latex in that blend. Thus 10 NRL/90 PL 341 is a blend of 10 parts by dry weight of natural rubber latex and 90 parts by dry weight of PL 341. PL 341 is styrene-butadiene latex sold by Polysar International S.A. under the trade name Polysar Latex 341. Electrofine S 70 is a trade name for chlorinated paraffin wax.

TABLE I

| | POLYMER | ADDITIVE | FOAM BURNS AFTER EXTINCTION OF CIGARETTE | COMMENT |
|---|---|---|---|---|
| 1. | 100 NRL | None | NO | No char; some surface melting |
| 2. | 10 NRL/90 PL 341 | None | YES | Burning continued with much smoke. Deep char formed |
| 3. | 10 NRL/90 PL 341 | 20 phr butyl benzyl phthalate | NO | Slight char, not dense |
| 4. | 10 NRL/90 PL 341 | 15 phr butyl benzyl phthalate | NO | Moderate char, some dense |
| 5. | 100 PL 341 | 20 phr isodecyl diphenyl phosphate | NO | Slight char, not dense, some surface melting |
| 6. | 10 NRL/90 PL 341 | 10 phr Electrofine S 70 | YES | As for 2 |
| 7. | 10 NRL/90 PL 341 | 20 phr Electrofine S 70 | NO | Deep dense char |
| 8. | 10 NRL/90 PL 341 | 15 phr Electrofine S 70, 5 phr $Sb_2O_3$ | YES | As for 2 but slower burn rate |
| 9. | 10 NRL/90 PL 341 | 20 phr isodecyl diphenyl phosphate | NO | Very slight char. Open not dense. Some surface |
| 10. | 10 NRL/90 PL 341 | 15 phr isodecyl diphenyl phosphate | NO | Some dense surface char. |
| 11. | 10 NRL/90 PL 341 | 5 phr $Sb_2O_3$, 15 phr isodecyl diphenyl phosphate | NO | As for 10. |
| 12. | 10 NRL/90 PL 341 | 10 phr aromatic oil, 15 phr isodecyl diphenyl phosphate | NO | Slight surface char. Open not dense. |
| 13. | 10 NRL/90 PL 341 | 10 phr Electrofine S 70, 15 phr isodecyl diphenyl phosphate | NO | As for 10 |
| 14. | 10 NRL/90 PL 341 | 10 phr Electrofine S 70, 5 phr $Sb_2O_3$, 15 phr isodecyl diphenyl phosphate | NO | As for 10 |
| 15. | 50 NRL/50 PL 341 | None | YES | As for 2 |

We claim:

1. A latex composition comprising from about 0 to about 15 parts by dry weight of natural rubber latex and correspondingly from about 100 to about 85 parts by dry weight of styrene-butadiene polymer latex having a styrene:butadiene ratio of from about 20:80 to about 40:60, characterized in that said composition additionally comprises per 100 parts by dry weight of total latex from about 10 to about 30 parts by weight of a compound selected from the group consisting of an organic phosphate of the formula

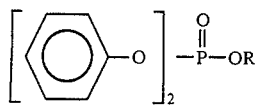

wherin R is a $C_{6-12}$ alkyl radical or a phenyl radical which is unsubstituted or substituted by a $C_{1-4}$ alkyl radical, butyl benzyl phthalate, and mixtures thereof.

2. The latex composition according to claim 1 characterized in that the amount of said natural rubber latex is from about 5 to about 15 parts by dry weight and the amount of said styrene-butadiene polymer latex is correspondingly from about 95 to about 85 parts by dry weight.

3. The latex composition according to claim 2 characterized in that the amount of said natural rubber latex is about 10 parts by dry weight, the amount of said styrene-butadiene polymer latex is about 90 parts by dry weight wherein said styrene:butadiene ratio is from about 28:72 to about 32:68, and the amount of said compound is from about 15 to about 20 parts by weight per 100 parts by dry weight of total latex wherein said compound is an organic phosphate.

4. The latex composition according to claim 3 characterized in that in said organic phosphate R is a $C_8$ alkyl radical.

5. The latex composition according to claim 3 characterized in that in said organic phosphate R is a $C_{10}$ alkyl radical.

6. The latex composition according to claim 3 characterized in that in said organic phosphate R is a phenyl radical.

7. The latex composition according to claim 3 characterized in that in said organic phosphate R is a tertiary butyl phenyl radical.

8. The latex composition according to claim 2 characterized in that the amount of said natural rubber latex is about 10 parts by dry weight, the amount of said styrene-butadiene polymer latex is about 90 parts by dry weight wherein said styrene:butadiene ratio is from about 28:72 to about 32:68, and the amount of said compound is from about 15 to about 20 parts by weight per 100 parts by dry weight of total latex wherein said compound is butyl benzyl phthalate.

9. A method of imparting resistance to charring to a molded foam manufactured from a latex comprising from about 0 to about 15 parts by dry weight of natural rubber latex and correspondingly from about 100 to about 85 parts by dry weight of styrene-butadiene polymer latex having a styrene:butadiene ratio of from about 20:80 to about 40:60 which method is characterized by adding to the total latex from about 10 to about 30 parts by weight per 100 parts by dry weight of said total latex of a compound selected from the group consisting of an organic phosphate of the formula

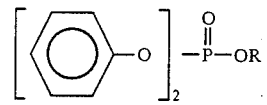

wherein R is a $C_{6-12}$ alkyl radical or a phenyl radical which is unsubstituted or substituted by a $C_{1-4}$ alkyl radical, butyl benzyl phthalate, and mixtures thereof.

10. The method according to claim 9 characterized in that the amount of said natural rubber latex is from about 5 to about 15 parts by dry weight and the amount of said styrene-butadiene polymer latex is correspondingly from about 95 to about 85 parts by dry weight.

11. The method according to claim 10 characterized in that the amount of said natural rubber latex is about 10 parts by dry weight, the amount of said styrene-butadiene polymer latex is about 90 parts by dry weight wherein said styrene:butadiene ratio is from about 28:72 to about 32:68, and the amount of said compound is from about 15 to about 20 parts by weight per 100 parts by dry weight of total latex wherein said compound is an organic phosphate.

12. The method according to claim 11 characterized in that in said organic phosphate R is a $C_8$ alkyl radical.

13. The method according to claim 11 characterized in that in said organic phosphate R is a $C_{10}$ alkyl radical.

14. The method according to claim 11 characterized in that in said organic phosphate R is a phenyl radical.

15. The method according to claim 11 characterized in that in said organic phosphate R is a tertiary butyl phenyl radical.

16. The method according to claim 10 characterized in that the amount of said natural rubber latex is about 10 parts by dry weight, the amount of said styrene-butadiene polymer latex is about 90 parts by dry weight wherein said styrene:butadiene ratio is from about 28:72 to about 32:68, and the amount of said compound is from about 15 to about 20 parts by weight per 100 parts by dry weight of total latex wherein said compound is butyl benzyl phthalate.

* * * * *